(12) United States Patent
Algarawi et al.

(10) Patent No.: US 11,930,019 B2
(45) Date of Patent: Mar. 12, 2024

(54) METHODS AND SYSTEMS FOR FAST-PACED DYNAMIC MALWARE ANALYSIS

(71) Applicant: Saudi Arabian Oil Company, Dhahran (SA)

(72) Inventors: Reem Abdullah Algarawi, Jubail (SA); Majed Ali Hakami, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 394 days.

(21) Appl. No.: 17/236,056

(22) Filed: Apr. 21, 2021

(65) Prior Publication Data

US 2022/0345467 A1    Oct. 27, 2022

(51) Int. Cl.
| | | |
|---|---|---|
| H04L 29/06 | (2006.01) | |
| G06F 9/455 | (2018.01) | |
| G06F 21/56 | (2013.01) | |
| H04L 9/40 | (2022.01) | |

(52) U.S. Cl.
CPC ...... *H04L 63/1416* (2013.01); *G06F 9/45558* (2013.01); *G06F 21/565* (2013.01); *G06F 2009/45587* (2013.01); *G06F 2009/45595* (2013.01); *G06F 2221/034* (2013.01)

(58) Field of Classification Search
CPC . H04L 63/1416; G06F 9/45558; G06F 21/565
See application file for complete search history.

(56) References Cited

U.S. PATENT DOCUMENTS

| | | | |
|---|---|---|---|
| 9,262,635 B2 | 2/2016 | Paithane et al. | |
| 9,609,015 B2 | 3/2017 | Natarajan et al. | |
| 9,846,776 B1 * | 12/2017 | Paithane | G06F 16/1734 |
| 9,942,251 B1 | 4/2018 | Wang et al. | |
| 9,996,695 B2 | 6/2018 | Liu et al. | |
| 10,469,509 B2 | 11/2019 | Nachenberg et al. | |
| 10,803,168 B2 | 10/2020 | Liu et al. | |

(Continued)

FOREIGN PATENT DOCUMENTS

| | | |
|---|---|---|
| CN | 103942491 A | 7/2014 |
| CN | 102930210 B | 11/2015 |

(Continued)

*Primary Examiner* — Jeffrey C Pwu
*Assistant Examiner* — Thong P Truong
(74) *Attorney, Agent, or Firm* — Dinsmore & Shohl LLP

(57) ABSTRACT

In one embodiment, a malware analysis method includes receiving a file on a virtual machine (VM). The VM includes, a web debugging proxy, a system resource monitor, and a file analysis tool. The method also includes performing, with the file analysis tool, a static analysis on the file. The static analysis includes determining a set of file properties of the file, and storing the determined file properties in a repository. The method further includes performing, with the web debugging proxy and the system resource monitor, a dynamic analysis on the file, the dynamic analysis includes running the file on the VM, determining, with the web debugging proxy, web traffic of the virtual machine, determining, with the system resource monitor, executed commands and modifications to system resources of the VM originating from the file, and storing the determined traffic and executed commands in the repository.

17 Claims, 8 Drawing Sheets

(56) References Cited

U.S. PATENT DOCUMENTS

2012/0144489 A1* 6/2012 Jarrett ................ G06F 9/45558
                                                      726/24
2015/0235026 A1   8/2015 Klein

FOREIGN PATENT DOCUMENTS

| CN | 107590382 A | 1/2018 |
| ES | 2429425 B1 | 3/2015 |
| KR | 20200057402 A | 5/2020 |

* cited by examiner

METHODS AND SYSTEMS FOR FAST-PACED DYNAMIC MALWARE ANALYSIS

TECHNICAL FIELD

The present disclosure relates to computer systems and methods. More particularly, the present disclosure relates to systems and methods for dynamic host-based malware behavior analysis.

BACKGROUND

Malware is computer software intended to harm the host system by disrupting its operations, gathering sensitive information, and/or otherwise harming the host computer. Malware can appear in a variety of forms including viruses, ransomware, worms, rootkits, key loggers, botnets, etc. Malware analysis is the process of determining the functionality, origin, and potential impact of a malware sample.

Current systems may analyze malware in a multi-faceted approach to learn information about a piece of malware. These approaches may involve multiple individuals using multiple tools to investigate potential malware. However, in the rapidly morphing landscape of malware threats and the increasing reliance on computers for daily operations, it is critical for malware analysis to be quick yet able to gather meaningful data, without putting computer systems at risk.

Therefore, alternative methods for malware analysis are desired.

SUMMARY

According to the subject matter of the present disclosure, embodiments of the present disclosure are directed to methods and systems for fast-paced dynamic malware analysis that streamline the process of extracting malware information.

In accordance with one embodiment of the present disclosure, a malware analysis method includes receiving a file on a virtual machine. The virtual machine includes, a web debugging proxy, a system resource monitor, and a file analysis tool. The method also includes performing, with the file analysis tool, a static analysis on the file. The static analysis includes determining a set of file properties of the file, and storing the determined file properties in a repository. The method further includes performing, with the web debugging proxy and the system resource monitor, a dynamic analysis on the file, the dynamic analysis. The dynamic analysis includes running the file on the virtual machine, determining, with the web debugging proxy, web traffic of the virtual machine, determining, with the system resource monitor, executed commands and modifications to system resources of the virtual machine originating from the file, and storing the determined traffic and executed commands in the repository.

In accordance with another embodiment of the present disclosure, a malware analysis system includes one or more processors and a non-transitory storage medium having machine-readable instructions that, when executed by the one or more processors, perform operations including receiving a file on a virtual machine. The virtual machine includes, a web debugging proxy, a system resource monitor, and a file analysis tool. The operations also include performing, with the file analysis tool, a static analysis on the file. The static analysis includes determining a set of file properties of the file, and storing the determined file properties in a repository. The operations further include performing, with the web debugging proxy and the system resource monitor, a dynamic analysis on the file, the dynamic analysis. The dynamic analysis includes running the file on the virtual machine, determining, with the web debugging proxy, web traffic of the virtual machine, determining, with the system resource monitor, executed commands and modifications to system resources of the virtual machine originating from the file, and storing the determined traffic and executed commands in the repository.

In accordance with yet another embodiment of the present disclosure, a non-transitory storage medium having machine-readable instructions that, when executed by one or more processors, cause the one or more processors to perform operations including receiving a file on a virtual machine. The virtual machine includes, a web debugging proxy, a system resource monitor, and a file analysis tool. The operations also include performing, with the file analysis tool, a static analysis on the file. The static analysis includes determining a set of file properties of the file, and storing the determined file properties in a repository. The operations further include performing, with the web debugging proxy and the system resource monitor, a dynamic analysis on the file, the dynamic analysis. The dynamic analysis includes running the file on the virtual machine, determining, with the web debugging proxy, web traffic of the virtual machine, determining, with the system resource monitor, executed commands and modifications to system resources of the virtual machine originating from the file, and storing the determined traffic and executed commands in the repository.

BRIEF DESCRIPTION OF THE DRAWINGS

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Embodiments of the present disclosure are directed to methods and systems for streamlined malware analysis processes. In embodiments, the malware analysis takes place in a sandbox environment having the tools to extract the characteristics of a file suspected of being malware to output to the host machine. As soon as a file is identified as suspicious, the system may set up a virtual machine (VM) to receive the file and collect enough artifacts (i.e., features) of the file to output to the system for digital forensics and cyber security analysts to investigate the potentially malicious nature of the file. A goal of the present disclosure is to streamline malware analysis by performing the extraction of file features completely within a VM.

Figure 1:
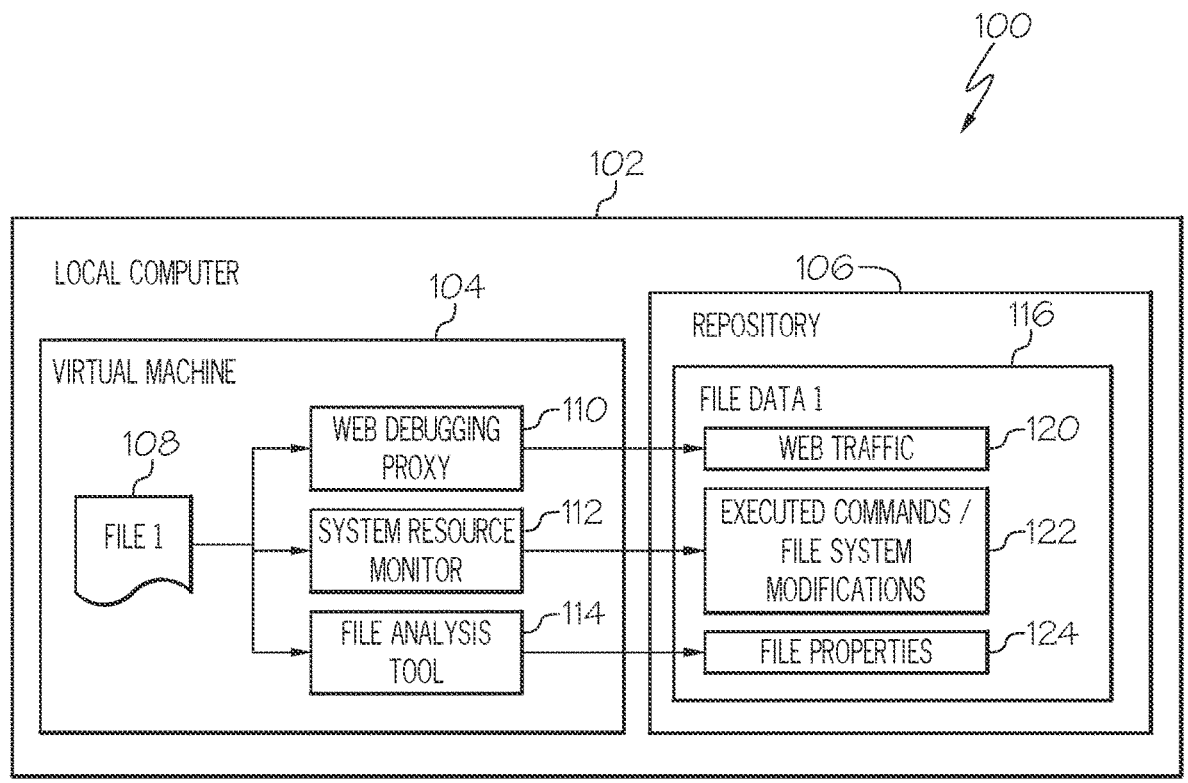
FIG. 1 depicts an example system for dynamic malware analysis on a local computer, according to one or more embodiments shown and described herein.

Referring now to FIG. 1, an example system 100 for malware analysis on a local computer 102 is depicted. An example system 100 for malware analysis may comprise a local computer 102 having one or more VMs 104 and a data repository 106.

A VM 104 is a computer file that behaves like an actual computer, such as a computer within a computer. VMs may be a preferable vehicle for malware analysis because they can easily be destroyed and recreated. VMs function as a sandbox environment because they are self-contained and any operations performed within a VM (including execution of malware) may be limited to the VM without causing damage to the physical system.

In embodiments of the present disclosure, the VM 104 may include a first file 108, a web debugging proxy 110, a system resource monitor 112, and a file analysis tool 114. The VM 104 may include more files and/or other analysis tools. Thus, it should be understood that the VM 104 may include more or fewer components than presently described.

The data repository 106 has a first file data 116 and other file data 117. The first file data 116 may comprise web traffic 120, executed commands and file system modifications 122, and file properties 124. Further discussion of the hardware components of computer 102 is included in FIG. 3, below.

The other file data 117 may include the data from other files including files that were previously analyzed by VM 104 or by other VMs 105. The data contained in each other file data 117 may also include web traffic, executed commands and file system modifications, and file properties from other analyzed files 109. It should be understood that VM 105, file 109, and file data 117 are separate instances of the same analysis of embodiments described herein and may represent more than one of such instances.

To run VMs 104, 105, the computer 102 includes processing hardware capable of virtualization and storage hardware having an operating system (OS). In this context, computer 102 may be referred to as a physical machine, physical system, or host. The OS of the physical system 102 may have a hypervisor to manage the VMs. Where the OS functions as the supervisor for the physical system 102 by allocating processing power, memory, storage operations, etc., the hypervisor manages each VM's supervisors. The hypervisor distributes system resources of the host system (e.g., processing hardware, memory, storage, etc.), giving the VM virtual resources that the VM's OS considers its own. The VM 104 may contain files and programs as any physical machine may as well.

To store data from the malware analysis, the computer 102 may also include storage hardware having a repository 106. The repository 106 can be a database, a file, or other forms of storage. After malware analysis is performed on the file 108 in the VM 104, the repository 106 receives file data 116 from the VM's 104 analysis of the file 108. The file data 116 may include data that corresponds with the malware analysis tools 110, 112, and 114 in the VM 104. For example, the file data 116 may include web traffic 120 gathered from the web debugging proxy 110, executed commands and file system modifications 122 gathered from the system resource monitor 112, and file properties 124 gathered from the file analysis tool 114. The repository 106 can retain the data for future file analyses or references. In some embodiments, the repository 106 can be another VM.

To execute the methods described herein, the computer 102 also includes memory hardware having machine-readable instructions. The instructions automate the process of setting up computer 102 into system 100. The instructions may automate the process of creating a new VM 104 with a web debugging proxy 110, system resource monitor 112, and file analysis tool 114. The instructions may also direct the VM 104 to execute the malware analysis to gather file 108 features to send as file data 116 to repository 106. The instructions may also direct the computer 102 to reset or destroy VM 104 when the analysis is complete. The instructions may include any combination or arrangement of the foregoing steps and may perform one or more instances of the foregoing steps in serial or in parallel.

Figure 2:
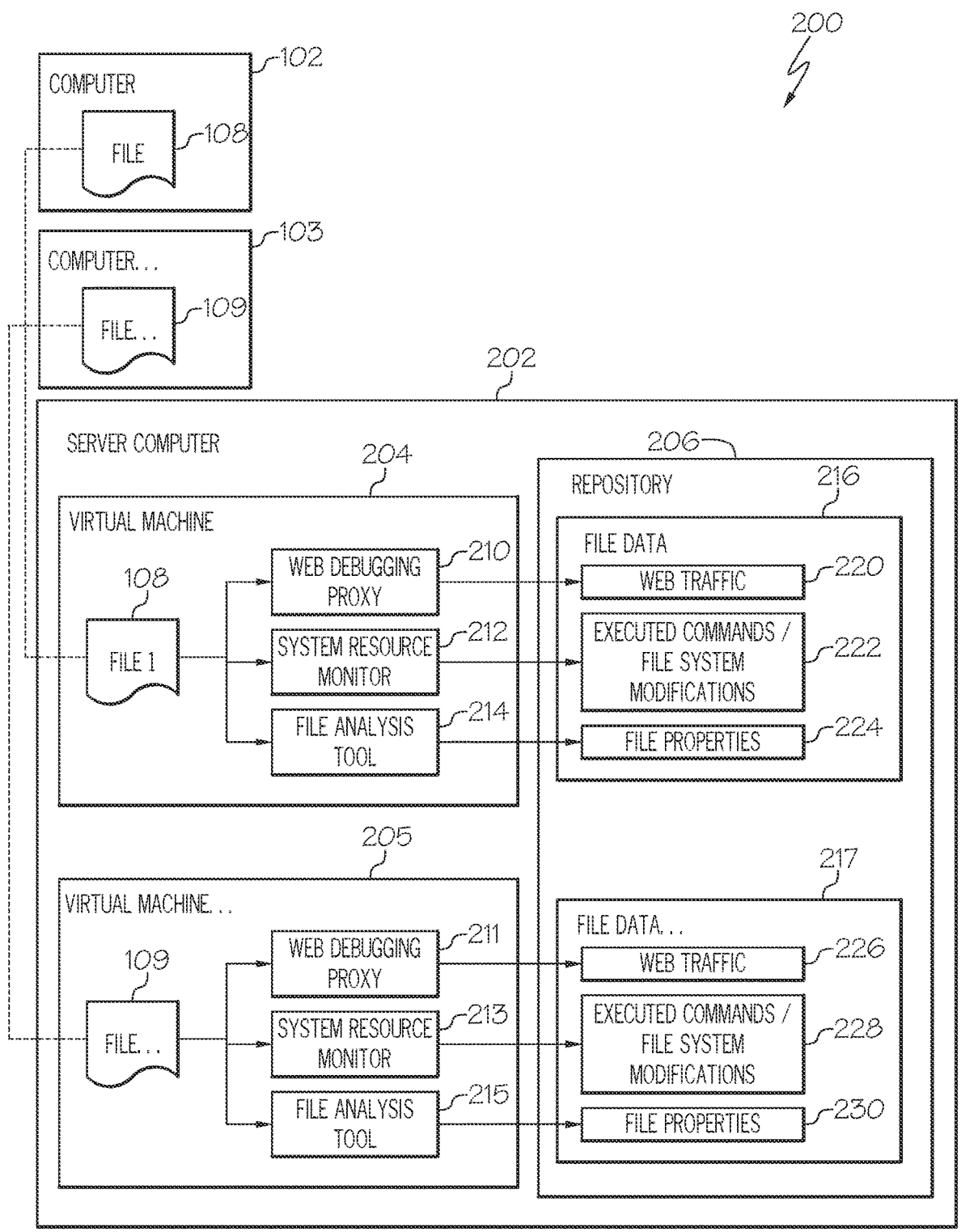
FIG. 2 depicts an example system for dynamic malware analysis on a remote computer with a file originating from a local computer, according to one or more embodiments shown and described herein.

Referring now to FIG. 2, an example system 200 for dynamic malware analysis on a remote computer 202 is depicted. An example system 200 for malware analysis may comprise a server computer 202 that is remote to user computers 102, 103 and has multiple VMs, such as VMs 204 and 205, and a data repository 206. The server computer 202 may be a single computer system, a distributed system (e.g., compute cluster), a container within a computer system, a VM, or other form of computing system. Further discussion of the hardware components of server computer 202 is included in FIG. 4, below.

VM 204 includes a first file 108, a web debugging proxy 210, a system resource monitor 212, and a file analysis tool 214. The VM 204 may include more files and other analysis tools. The file 108 may originate from a user computer 102 and may be sent to server computer 202 for analysis. Performing file analysis on a server computer 202 may add an additional layer of security when executing the malware during analysis and may be more efficient than performing the analysis on computer 102 because the server computer 202 may contain more powerful hardware.

The data repository 206 has a first file data 216 and other file data 218. The first file data 216 comprises web traffic 220, executed commands and file system modifications 222, and file properties 224. The other file data 218 includes the data from other files including files that were in VM 204 or other VMs. The data contained in each other file 218 may also include web traffic, executed commands and file system modifications, and file properties.

Server computer 202 may have additional VM instances, such as VM 205. Additional VMs should be similar to VM 204 to ensure uniformity in malware analysis. As such, VM 205 may include a file 109, a web debugging proxy 211, a system resource monitory 213, and a file analysis tool 215. The file 109 may originate from another user computer 103 and was sent to server computer 202 for analysis. Allocating a VM for each received file, including files 108 and 109, has the benefit of performing separate file analyses in parallel and gathering information that is directly attributable to a single file.

Figure 3:
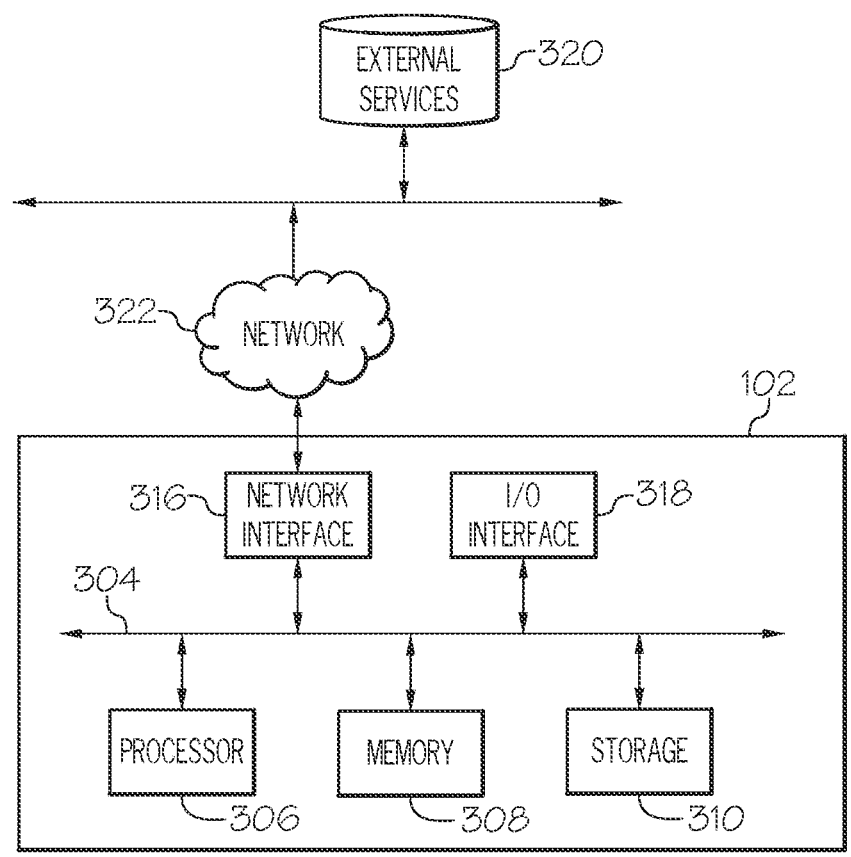
FIG. 3 depicts a schematic diagram of a local computer, according to one or more embodiments shown and described herein.

Referring now to FIG. 3, a schematic diagram of a local computer 102 is depicted. The local computer 102 may comprise a communication path 304, processing hardware 306, memory hardware 308, storage hardware 310, network interface hardware 316, and I/O interface hardware 318. The local computer 102 may connect to external services 320 via a network 322. External services 320 may include remote computer 202.

The processing hardware 306 may include one or more processors that may be any device capable of executing machine readable and executable instructions. Accordingly, each of the one or more processors of the processing hardware 306 may be a controller, an integrated circuit, a microchip, or any other computing device. The processing hardware 306 is coupled to the communication path 304 that provides signal connectivity between the various components of the computer 102. Accordingly, the communication path 304 may communicatively couple any number of processors of the processing hardware 306 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 304 may be formed from any medium that is capable of transmitting a signal such as, e.g., conductive wires, conductive traces, optical waveguides, and the like. In some embodiments, the communication path 304 may facilitate the transmission of wireless signals, such as Wi-Fi, Bluetooth, Near-Field Communication (NFC), and the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory hardware 308 is communicatively coupled to the communication path 304 and may contain one or more memory modules comprising RAM, ROM, flash memories, hard drives, or any device capable of storing machine readable and executable instructions such that the machine readable and executable instructions can be accessed by the processing hardware 306. The machine readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory hardware 308. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The computer 102 may also include data storage hardware 310. The data storage hardware 310 is communicatively coupled to the communication path 304 and may contain one or more persistent storage devices such as solid state drives, hard disk drives, or any other device capable of persistent data storage. The data storage hardware 310 may store data used by various components of the computer 102 such as a repository 106. In addition, the data storage hardware 310 may store data gathered from external services 320 and/or received from VMs. The data storage hardware 310 may also include indexes of the files and their corresponding file data.

It should be understood that the data storage hardware 310 may reside local to and/or remote from the computer 102, and may be configured to store one or more pieces of data for access by the computer 102 and/or other components. Other data to perform the functionalities described herein may also be stored in the data storage hardware 310 (e.g., cached data, user session data, VM files, etc.).

The computer 102 also comprises network interface hardware 316. The network interface hardware 316 is communicatively coupled to the communication path 304. The network interface hardware 316 can be any device capable of transmitting and/or receiving data via a network or other communication mechanisms. Accordingly, the network interface hardware 316 can include a communication transceiver for sending and/or receiving any wired or wireless communication. For example, the network interface hardware 316 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The network interface hardware 316 communicatively connects the computer 102 to external systems, such as external services 320, via a network 322. The network 322 may be a wide area network, a local area network, a personal area network, a cellular network, a satellite network, and the like.

External services 320 include services that operate beyond the computer 102 that may be utilized by the computer 102, such as external databases of known malware attributes, external databases of VM files having various operating systems, external data storage services, external processing services, external user authentication services, etc.

It should be understood that the components illustrated in FIG. 3 are merely illustrative and are not intended to limit the scope of this disclosure. More specifically, while the components in FIG. 3 are illustrated as residing within computer 102, this is a non-limiting example. In some embodiments, one or more of the components may reside external to computer 102. In some embodiments, the computer 102 may exist as a virtual machine operating within a host machine alongside other virtual machines, each of which share the same computing resources belonging to the host machine.

Figure 4:
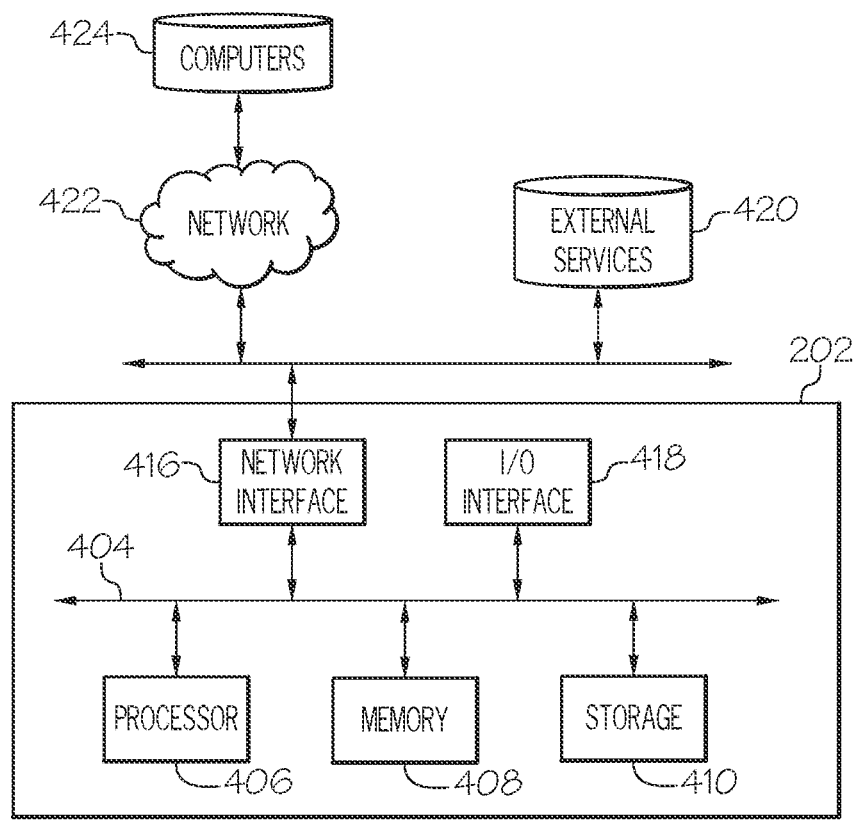
FIG. 4 depicts a schematic diagram of a remote computer, according to one or more embodiments shown and described herein.

Referring now to FIG. 4, a schematic diagram of a remote computer 202 is depicted. The remote computer 202 may be a server device, another computer on the local network, or some other computing device. The remote computer 202 may comprise a communication path 404, processing hardware 406, memory hardware 408, storage hardware 410, network interface hardware 416, and I/O interface hardware 418. The server computer 202 may connect to external services 420 via a network 422 as well as other computers 424, which may include computer 102.

Each component of remote computer 202 is similar in features to its local computer 102 counterparts, described in detail in FIG. 3, above.

Computers 424 include computers that are used by individual users of the system such as laptop computers, desktop computers, smartphones, tablets, etc. that a user of the system may be requesting a malware analysis from and where the features of the analyzed file may be presented to the user. Features of the analyzed file may also be directed to a destination other than the originating computer.

It should be understood that the components illustrated in FIG. 4 are merely illustrative and are not intended to limit the scope of this disclosure. More specifically, while the components in FIG. 4 are illustrated as residing within computer 202, this is a non-limiting example. In some embodiments, one or more of the components may reside external to computer 202. In some embodiments, the computer 202 may exist as a virtual machine operating within a host machine alongside other virtual machines, each of which share the same computing resources belonging to the host machine.

Figure 5:
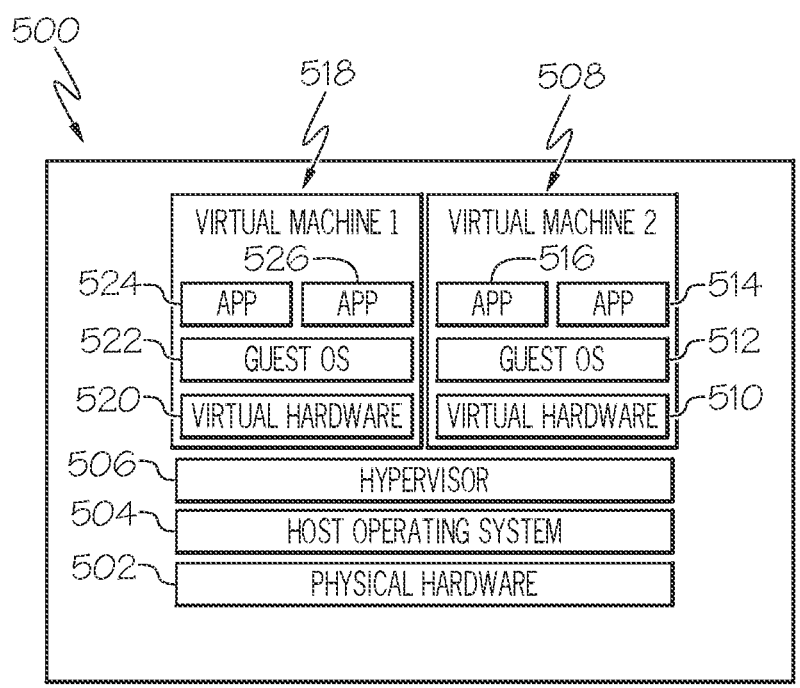
FIG. 5 depicts a schematic diagram of a computer with virtual machines, according to one or more embodiments shown and described herein.

Referring now to FIG. 5, a schematic diagram of a computer with VMs 500 is depicted. The computer 500 is representative of other computers described herein, such as user computers 102 and 103 and server computer 202, and computers containing VMs, generally.

The host computer 500 has physical hardware 502, an OS 504, and a hypervisor 506. The physical hardware 502 may include hardware components in computers 102, 103, and 202 described in FIGS. 3 and 4, above.

The OS 504 operates as a supervisor to the physical hardware 502. As a supervisor, the OS 504 allocates system resources (i.e., physical hardware 502) to programs that run on the computer 500. For example, if there are three programs on the computer 500 and an OS 504, the OS 504 may allocate processor time between the programs and the OS 504 so that none of them can take up all of the processor's time, rendering the other programs or OS 504 unresponsive. The OS 504 may allocate processor time in a "round robin" fashion such that the first program gets one-fourth of a second to run, the second program gets one-fourth of a second to run, the third program gets one-fourth of a second to run, the OS gets one-fourth of a second to run, etc. The divisions of time may be so small such that it appears to humans that the processor is operating each program and the OS simultaneously.

The hypervisor 506 acts as a liaison between the supervisor of the host computer 504 and the supervisor 512 and 522 of the VMs 508 and 518. The hypervisor 506 allocates physical hardware of the host computer 500 to the VMs 508 and 518. This allocated hardware exists as virtual hardware 510 and 520 in VMs 508 and 518. The host computer 500 may have fewer or more VMs, as its physical hardware 502 permits.

Each VM 508 and 518 functions as a discrete computer with its own virtual hardware 510 and 520, OS 512 and 522, and applications 514, 516, 524, and 526. Because they function as a separate computer, VMs 508 and 518 may run malware and be affected by the malware like a physical computer would be affected. The malware may also be examined before running to gather file properties while the VM is in an unaffected state. Because VMs 508 and 518 are isolated (i.e., "sandbox") environments, the damage caused by malware may be limited to the VM. The VM may be destroyed and recreated to perform multiple repetitions of an analysis on a file or analyses of multiple files. The VM may also have an OS 512 and 522 based on the file received. For example, the file may only run on Microsoft Windows, and thus a VM with a Microsoft Windows OS would be appropriate.

Figure 6:
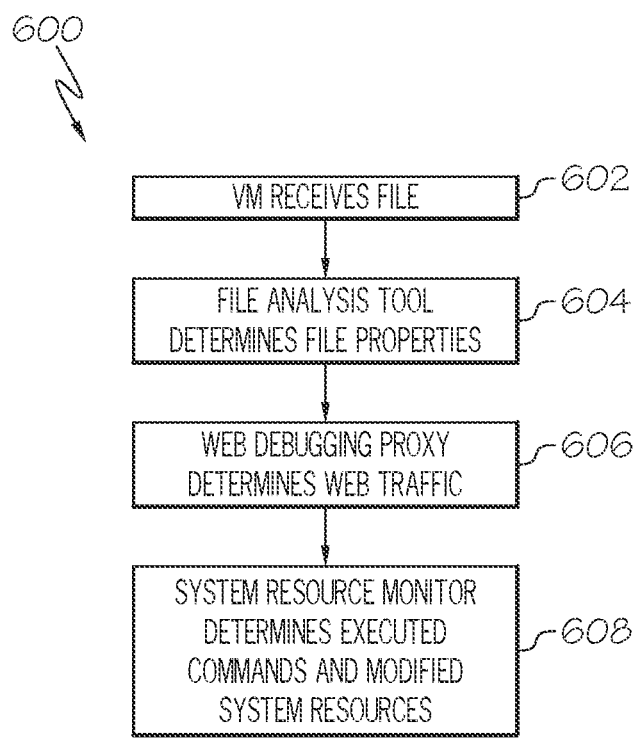
FIG. 6 depicts a flowchart of an example malware analysis method, according to one or more embodiments shown and described herein.

Referring now to FIG. 6, a flowchart 600 of an example method is depicted. The flowchart 600 is described by referring to FIGS. 1 and 3. At step 602, the VM 104 receives a file 108. The VM 104 is one of potentially many instances of a VM on local computer 102. VMs may be stored in the data storage hardware 310 of computer 102. The VM 104 may comprise a web debugging proxy 110, a system resource monitor 112, and a file analysis tool 114.

At step 604, the VM 104 performs a static analysis on the file 108. That is, an analysis that does not run the file 108. The file analysis tool 114 is used to perform the static analysis. The file analysis tool 114 may be one or more programs that analyze the binaries of the file, such as a Portable Executable (PE) file examiner. The static analysis comprises determining the properties of the file 108. Such properties include metadata, specifications, sections, hashes, unique strings, and other file properties. The file properties 124 determined in the static analysis may be stored in the repository 106 as file data 116 that may be used by digital forensics and cybersecurity security analysts. The file properties 124 may be stored in an intermediate storage environment internal or external to the VM before storage in the repository 106.

Following the static analysis is a dynamic analysis comprising steps 606 and 608. At step 606, the web debugging proxy 110 determines web traffic 120 of the computer 102. Before the file 108 is executed, the web debugging proxy 110 may take a baseline reading of web traffic to establish a baseline. The baseline reading of web traffic may be subtracted from the web traffic 120 after the file 108 is executed to filter any noise.

Noise may include innocuous web traffic that originated from the OS or other installed programs that create web traffic regardless of whether file 108 has been executed. Noise may include, for example, the OS reaching out to a server to check for new updates, the clock checking for the most recent time, etc. Although the host computer may prevent web traffic to and from VMs to prevent the virus from spreading or causing damage beyond the VM, attempts to generate web traffic may still occur. For example, malware, when executed, may attempt to establish a connection with a server outside of the local network for instructions on how to proceed once embedded on a computer. Monitoring this type of web traffic may provide cybersecurity analysts key insight into where the "command center" of the malware may be or where the malware originates from.

At step 608, the system resource monitor 112 determines executed commands and modified system resources 122 of computer 102. System resources are parts of a computer that can be controlled and assigned by the OS so that all of the hardware and software on the computer can work together such as processing hardware 306, memory 308, storage hardware 310, and information contained within memory 308 and storage hardware 310. Before the file 108 is executed, the system resource monitor 112 may take a baseline reading of executed commands and modified system resources to establish a baseline. The baseline reading of executed commands and modified system resources may be subtracted from executed commands and modified system resources 122 after the file 108 is executed to filter any noise.

Noise may include innocuous commands and system resource modifications that originated from the OS or other installed programs that run commands and modify system resources regardless of whether file 108 has been executed. Noise may include, for example, the commands the OS automatically executes upon system startup and temporary log files generated by the OS for debugging purposes.

When the file 108 is executed, the file 108 may run a set of commands on the VM 104 and/or modify the VM's 104 system resources. Commands a piece of malware might make include commands to activate/deactivate a webcam, log keystrokes, and other malicious activity. Commands may also include modifying system resources. System resource modification may include the creation, removal, duplication, encryption, and/or transfer of files, among other things. Monitoring executed commands and modified system resources may provide cybersecurity analysts key insight into the damage potential of the malware and what actions can be taken to mitigate the effects of the malware.

Figure 7:
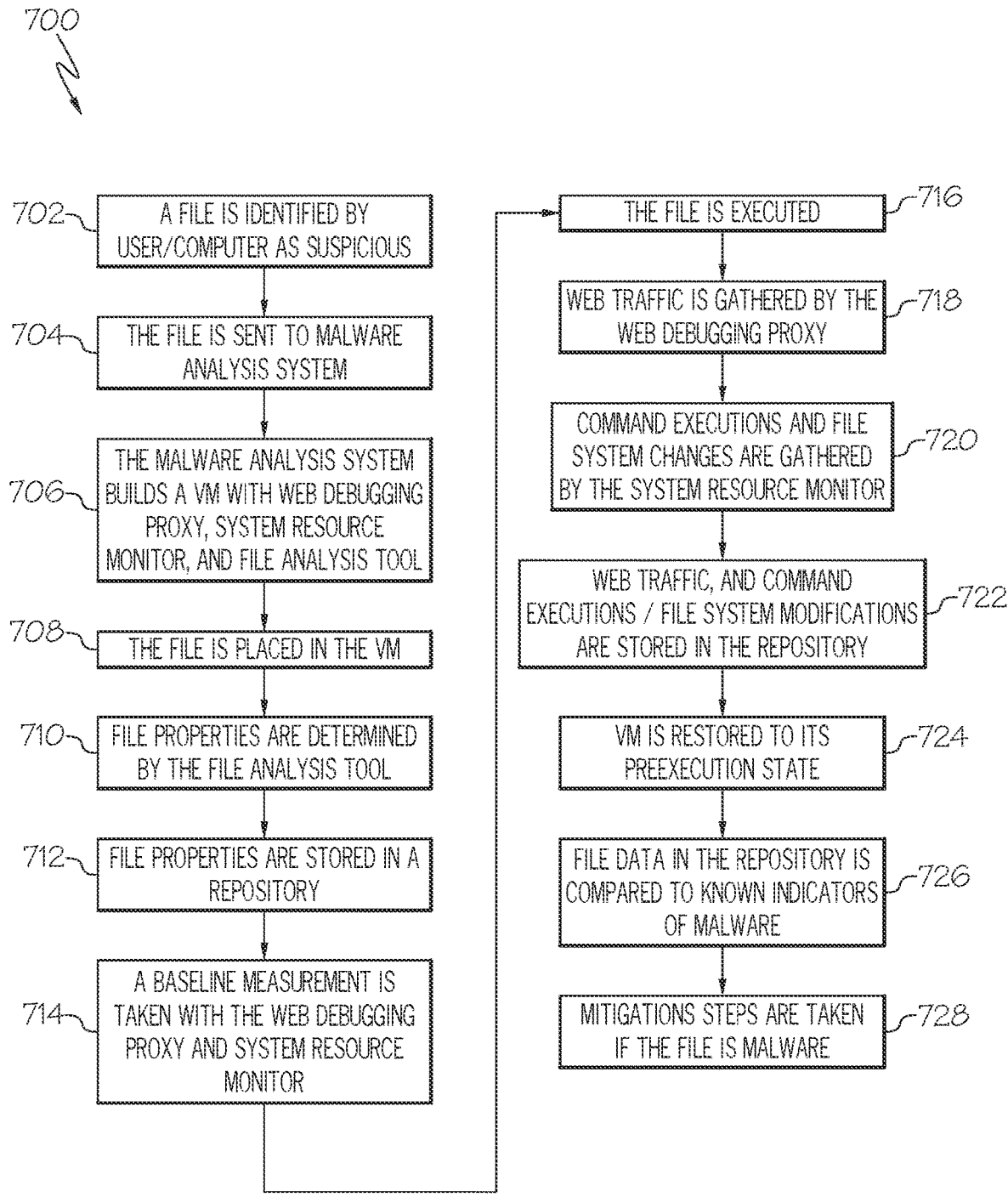
FIG. 7 depicts a flowchart of an example malware analysis method on a local computer, according to one or more embodiments shown and described herein.

Referring now to FIG. 7, a flowchart 700 of an example use case of a method executed on a local computer is depicted. The flowchart 700 is described by referring to FIGS. 1 and 3. At step 702, a file 108 is identified as being potential malware. The identification may be based on a user report. For example, a user reports to IT that they clicked on an ad that downloaded a strange file onto their computer. The identification may also be based on a computer program, of which embodiment methods disclosed herein may be a part. For example, a computer program briefly analyzes each file downloaded for file names, hashes, and other unique identifiers that have been classified as malware in the past. If on a brief analysis the file appears suspicious, the program may flag it for further analysis according to embodiment methods described herein.

At step 704, the identified file 108 is sent to a malware analysis system 100. The malware analysis system may be a computer 102 having a computer program, a web-based application, a browser plug-in, or some other form of software. The malware analysis system 100 may also include a hypervisor capable of managing VMs. The file 108 may be automatically collected by the system 100 or the user may upload to the software or otherwise designate the file 108 for analysis.

At step 706, the malware analysis system 100 builds a VM 104 comprising a web debugging proxy 110, system resource monitor 112, and file analysis tool 114. The type of VM may be based on the file type of the file 108. For example, if file 108 has a Portable Executable file type, the VM should be a VM having the Microsoft Windows OS. If file 108 has a PKG file type, the VM should be a VM having the Apple MacOS OS. The VM file may exist on the computer 102 or may be downloaded from external services 320. The VM 104 may be present in the user interface to show its execution. The system may take a VM snapshot to later restore the VM to its condition prior to receiving the file.

At step 708, the file 108 is placed in the VM 104. The file may be placed in the VM 104 by mounting it as a virtual drive. The virtual drive may be a predetermined drive so that the VM 104 may be pre-programmed to search for the file 108 in the predetermined drive. The VM 104 may be programmed to instantiate with the virtual drive mounted, fetch the file 108 from the virtual drive, and proceed with analysis on the file 108.

At step 710, the file properties 124 are determined by the file analysis tool 114. The file analysis tool 114 may be one or more programs that analyzes the binaries of the file, such as a Portable Executable file examiner. File properties 124 gathered may include metadata, specifications, sections, hashes, unique strings, and other file properties.

At step 712, the file properties 124 are stored in a repository 106. The file properties 124 may be stored on the VM 104 or in a separate repository 106. The repository 106 may be another VM, database, or file on the computer 102. The file properties 124 determined may be stored in the repository 106 as file data 116 that may be used by digital forensics and cybersecurity security analysts. The file properties 124 may be stored in an intermediate storage environment internal or external to the VM 104 before storage in the repository 106.

At step 714, a baseline measurement is taken with the web debugging proxy 110 and system resource monitor 112. Before the file 108 is executed, the web debugging proxy 110 may take a reading of web traffic to establish a baseline. The baseline reading of web traffic may be subtracted from the web traffic 120 after the file 108 is executed to filter any noise. Noise may include innocuous web traffic that originated from the OS or other installed programs that create web traffic regardless of whether file 108 has been executed. Although the host computer may prevent web traffic to and from VMs to prevent the virus from spreading or causing damage beyond the VM, attempts to generate web traffic may still occur.

Before the file 108 is executed, the system resource monitor 112 may also take a reading of executed commands and modified system resources to establish a baseline. The baseline reading of executed commands and modified system resources may be subtracted from executed commands and modified system resources 122 after the file 108 is executed to filter any noise. Noise may include innocuous commands and system resource modifications that originated from the OS or other installed programs that run commands and modify system resources regardless of whether file 108 has been executed.

At step 716, the file 108 is executed to infect the VM 104. Because the file 108 is in a VM 104, the file runs as if it is in an ordinary computer. Because the VM 104 is a sandbox environment, any damage caused to the VM 104 is limited to the VM 104. The infected VM 104 is capable of being destroyed or restored to its previous snapshot that may have been taken in step 706.

At step 718, while the file 108 is running, web traffic 120 is gathered by the web debugging proxy 110. The VM 104 may be programmed to allow or block incoming or outgoing web traffic beyond the VM 104. Allowing web traffic to go beyond the VM and allowing the VM to receive web traffic provides further insights into how the malware behaves and what kind of instructions it receives. For example, outgoing web traffic may show who the malware is attempting to contact, which may also show where the malware originated from. Incoming web traffic may be commands from a control center, which may be collected by the web debugging proxy 110, that may show what the malware is used for.

At step 720, while the file 108 is running, executed commands and modified system resources 122 is gathered by the system resource monitor 112. The file 108 may run a set of commands on the computer 102. Commands may also include modifying system resources. Monitoring executed commands and modified system resources may provide cybersecurity analysts key insight into the damage potential of the malware and what actions can be taken to mitigate the effects of the malware.

At step 722, web traffic 120, and command executions and file system modifications 122 are stored in the repository 106 along with file properties 124 as file data 116. The web traffic 120 and command executions and file system modifications 122 may be stored on the VM 104 or in a separate repository 106. The repository 106 may be another VM or may exist as a database or file on the computer 102. The web traffic 120, and command executions and file system modifications 122 determined may be stored in the repository 106 as file data 116 that may be used by digital forensics and cybersecurity security analysts. The web traffic 120, and command executions and file system modifications 122 may be stored in an intermediate storage environment internal or external to the VM 104 before storage in the repository 106.

At step 724, the VM is restored to its pre-execution state. This may be performed by reverting the VM 104 to its snapshot state from step 706. This may also be performed by destroying and recreating the VM 104 and replacing the file 108 in the VM 104.

At step 726, file data 116 in repository 106 is compared to known indicators of malware. The known indicators of malware may exist as other file data 118 in repository 106, as a database stored in computer 102, or on external services 320. Known indicators of malware may be indicators known to digital forensics and cybersecurity analysts who review the file data 116.

At step 728, mitigation steps are taken if the file 108 is malware. If there is a match in the known indicators of malware or digital forensics and cybersecurity analysts identify the file 108 as malware, steps may be taken to mitigate the effects of the malware. With all the file data 116 gathered, there is enough information known about the characteristics and effects of the malware to mitigate damage from the malware. For example, firewall rules can be established to block communications to the identified command center of the malware, added files can be removed, removed files can be restored, altered permissions can be restored, along with other mitigation steps. The file data 116 may be retained in the repository 106 for future comparisons to more readily identify a future file as being malware like file 108.

The foregoing steps may be completed with optional user interaction or completely automatically, thereby streamlining the process from identification to extraction of malware features.

Figure 8:
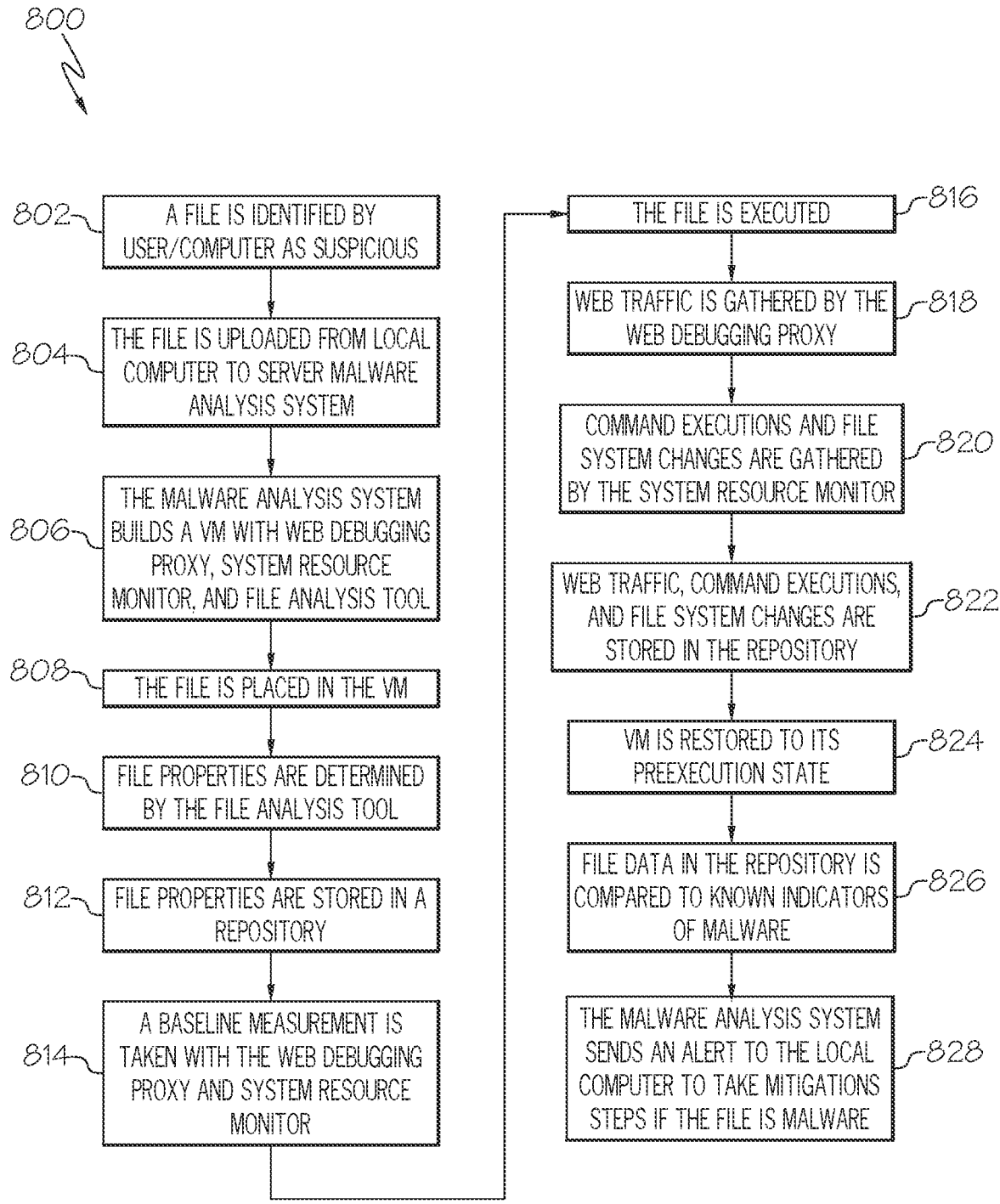
FIG. 8 depicts a flowchart of an example malware analysis method on a remote computer, according to one or more embodiments shown and described herein.

Referring now to FIG. 8, a flowchart 800 of an example use case of a method executed on a remote computer is depicted. The flowchart 800 is described by referring to FIGS. 2 and 4. At step 802, a file 108 is identified as being potential malware. The identification may be based on a user report. For example, a user of a computer 102 within user computers 424 reports to IT that they clicked on an ad that downloaded a strange file onto their computer 102. The identification may also be based on a computer program, of which embodiment methods disclosed herein may be a part. For example, a computer program briefly analyzes each file downloaded for file names, hashes, and/or other unique identifiers that have been classified as malware in the past. If on a brief analysis the file appears suspicious, the program may flag it for further analysis according to embodiment methods described herein.

At step 804, the identified file 108 is uploaded to a malware analysis system 200 on a server computer 202. The malware analysis system 200 may include a computer program, a web-based application, a browser plug-in, or some other form of software. The malware analysis system 200 may also include a hypervisor capable of running VMs, such as VM 204. The file 108 may be automatically uploaded to the server computer 202 by computer 102 or the user may manually upload the file 108 to the server computer 202 or otherwise designate the file 108 for analysis.

At step 806, the malware analysis system 200 builds a VM 204 having a web debugging proxy 210, system resource monitor 212, and file analysis tool 214. The type of VM may be based on the file type of the file 108. For example, if file 108 has a Portable Executable file type, the VM should be a VM having the Microsoft Windows OS. If file 108 has a PKG file type, the VM should be a VM having the Apple MacOS OS. The VM file may exist on the server computer 202 or may be downloaded from external services 420. The VM 204 may be headless (i.e., without a user interface) to run in the background. The system 200 may take a VM snapshot to later restore the VM to its condition prior to receiving the file.

At step 808, the file 108 is placed in the VM 204. The file may be placed in the VM 204 by mounting it as a virtual drive. The virtual drive may be a predetermined drive so that the VM 204 may be pre-programmed to search for the file 108 in the predetermined drive. The VM 204 may be programmed to instantiate with the virtual drive mounted, fetch the file 108 from the virtual drive, and proceed with analysis on the file 108.

At step 810, the file properties 224 are determined by the file analysis tool 214. The file analysis tool 214 may be one or more programs that analyze the binaries of the file, such as a Portable Executable file examiner. File properties 124 gathered may include metadata, specifications, sections, hashes, unique strings, and other file properties.

At step 812, the file properties 224 are stored. The file properties 224 may be stored on the VM 204 or in a separate repository 206. The repository 206 may be another VM, database, or file on the computer 202. The file properties 224 determined may be stored in the repository 206 as file data 216 that may be used by digital forensics and cybersecurity security analysts. The file properties 224 may be stored in an intermediate storage environment internal or external to the VM 204 before storage in the repository 206.

At step 814, a baseline measurement is taken with the web debugging proxy 210 and system resource monitor 212. Before the file 108 is executed, the web debugging proxy 210 may take a reading of web traffic to establish a baseline. The baseline reading of web traffic may be subtracted from the web traffic 220 after the file 108 is executed to filter any noise. Noise may include innocuous web traffic that originated from the OS or other pre-installed programs that create web traffic regardless of whether file 108 has been executed. Although the host computer may prevent web traffic to and from VMs to prevent the virus from spreading or causing damage beyond the VM, attempts to generate web traffic may still occur.

Before the file 108 is executed, the system resource monitor 212 may also take a reading of executed commands and modified system resources to establish a baseline. The baseline reading of executed commands and modified system resources may be subtracted from executed commands and modified system resources 222 after the file 108 is executed to filter any noise. Noise may include innocuous commands and system resource modifications that originated from the OS or other pre-installed programs that run commands and modify system resources regardless of whether file 108 has been executed.

At step 816, the file 108 is executed to infect the VM 204. Because the file 108 is in a VM 204, the file 108 runs as if it is in an ordinary computer. Because the VM 204 is a sandbox environment, any damage caused to the VM 204 is limited to the VM 204. The infected VM 204 is capable of being destroyed or restored to its previous snapshot that may have been taken in step 806.

At step 818, while the file 108 is running, web traffic 220 is gathered by the web debugging proxy 210. The VM 204 may be programmed to allow or block incoming or outgoing web traffic beyond the VM 204. Allowing web traffic to go beyond the VM and allowing the VM to receive web traffic provides further insights into how the malware behaves and what kind of instructions it receives. For example, outgoing web traffic may show who the malware is attempting to contact, which may also show where the malware originated from. Incoming web traffic may be commands from a control center, which may be collected by the web debugging proxy 210, that may show what the malware is used for.

At step 820, while the file 108 is running, executed commands and modified system resources 222 is gathered by the system resource monitor 212. The file 108 may run a set of commands on the computer 202. Commands may also include modifying system resources. Monitoring executed commands and modified system resources may provide cybersecurity analysts key insight into the damage potential of the malware and what actions can be taken to mitigate the effects of the malware.

At step 822, web traffic 220, and command executions and file system modifications 222 may be stored in the repository 206 along with file properties 224 as file data 216. The web traffic 220 and command executions and file system modifications 222 may be stored on the VM 204 or in a separate repository 206. The repository 206 may be another VM, database, or file on the server 202. The web traffic 220, and command executions and file system modifications 222 determined may be stored in the repository 206 as file data 216 that may be used by digital forensics and cybersecurity security analysts. The web traffic 220, and command executions and file system modifications 222 may be stored in an intermediate storage environment internal or external to the VM 204 before storage in the repository 206.

At step 824, the VM 204 may be restored to its pre-execution state. This may be performed by reverting the VM 204 to its snapshot state from step 806. This may also be performed by destroying and recreating the VM 204 and replacing the file 108 in the VM 204.

At step 826, file data 216 in repository 206 may be compared to known indicators of malware. The known indicators of malware may exist as other file data 218 in repository 206, as a database stored in computer 202, or on external services 420. Known indicators of malware may be indicators known to digital forensics and cybersecurity analysts who review the file data 216.

At step 828, mitigation steps may be taken if the file 108 is malware. If there is a match in the known indicators of malware or digital forensics and cybersecurity analysts identify the file 108 as malware, steps may be taken to mitigate the effects of the malware. With all the file data 216 gathered, there is enough information known about the characteristics and effects of the malware to mitigate damage from the malware. For example, firewall rules can be established to block communications to the identified command center of the malware, added files can be removed, removed files can be restored, altered permissions can be restored, along with other mitigation steps. The file data 216 may be retained in the repository 206 for future comparisons to more readily identify a future file as being malware like file 108.

The foregoing steps may be completed with minimal user interaction or completely automatically, thereby streamlining the process from identification to extraction of malware features.

It should now be understood that embodiments of the present disclosure are directed to methods and systems for fast-paced dynamic malware analysis. Embodiments streamline the malware analysis process performing the extraction of file features completely within a VM. The malware analysis takes place in a sandbox environment having all the tools necessary to extract the features of a file suspected of being malware to output to the host machine. As soon as a file is identified as suspicious, the system may set up a VM to receive the file and collect enough features of the file to output to the system for digital forensics and cyber security analysts to investigate the potentially malicious nature of the file.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A malware analysis method comprising:
　receiving a file on a virtual machine, the virtual machine comprising:
　　a web debugging proxy, wherein the web debugging proxy is prepared to filter web traffic noise by gathering a baseline reading of web traffic of the virtual machine,
　　a system resource monitor, and
　　a file analysis tool;
　performing, with the file analysis tool, a static analysis on the file, the static analysis comprising:
　　determining a set of file properties of the file; and storing the determined file properties in a repository;
performing, with the web debugging proxy and the system resource monitor, a dynamic analysis on the file, the dynamic analysis comprising:
running the file on the virtual machine;
determining, with the web debugging proxy, web traffic of the virtual machine;
determining, with the system resource monitor, executed commands and modifications to system resources of the virtual machine originating from the file; and
storing the determined traffic and executed commands in the repository.

2. The method of claim 1, wherein determining a set of file properties of the file includes binary data, metadata, sections, file hashes, and unique strings.

3. The method of claim 1, further comprising removing, after determining web traffic of the virtual machine to external sources, the baseline reading of web traffic of the virtual machine to filter the determined web traffic of noise.

4. The method of claim 1, wherein the virtual machine further comprises an operating system based on a file type of the file.

5. The method of claim 1, further comprising restoring the virtual machine to its condition prior to receiving the file.

6. The method of claim 1, further comprising comparing the repository against one or more databases of known indicators of malware.

7. A malware analysis system comprising:
one or more processors; and
a non-transitory storage medium having machine-readable instructions that, when executed by the one or more processors, perform operations comprising:
receiving a file on a virtual machine, the virtual machine comprising:
a web debugging proxy, wherein the web debugging proxy is prepared to filter web traffic noise by gathering a baseline reading of web traffic of the virtual machine;
a system resource monitor; and
a file analysis tool;
performing, with the file analysis tool, a static analysis on the file, the static analysis comprising:
determining a set of file properties of the file; and
storing the determined file properties in a repository;
performing, with the web debugging proxy and the system resource monitor, a dynamic analysis on the file, the dynamic analysis comprising:
running the file on the virtual machine;
determining, with the web debugging proxy, web traffic of the virtual machine;
determining, with the system resource monitor, executed commands and modifications to system resources of the virtual machine originating from the file; and
storing the determined traffic and executed commands in the repository.

8. The system of claim 7, wherein determining a set of file properties of the file includes binary data, metadata, sections, file hashes, and unique strings.

9. The system of claim 7, further comprising removing, after determining web traffic of the virtual machine to external sources, the baseline reading of web traffic of the virtual machine to filter the determined web traffic of noise.

10. The system of claim 7, wherein the virtual machine further comprises an operating system based on a file type of the file.

11. The system of claim 7 further comprising restoring the virtual machine to its condition prior to receiving the file.

12. The system of claim 7, further comprising comparing the repository against one or more databases of known indicators of malware.

13. A non-transitory storage medium having machine-readable instructions that, when executed by one or more processors, cause the one or more processors to perform operations comprising:
receiving a file on a virtual machine, the virtual machine comprising:
a web debugging proxy, wherein the web debugging proxy is prepared to filter web traffic noise by gathering a baseline reading of web traffic of the virtual machine,;
a system resource monitor; and
a file analysis tool;
performing, with the file analysis tool, a static analysis on the file, the static analysis comprising:
determining a set of file properties of the file; and
storing the determined file properties in a repository;
performing, with the web debugging proxy and the system resource monitor, a dynamic analysis on the file, the dynamic analysis comprising:
running the file on the virtual machine;
determining, with the web debugging proxy, web traffic of the virtual machine;
determining, with the system resource monitor, executed commands and modifications to system resources of the virtual machine originating from the file; and
storing the determined traffic and executed commands in the repository.

14. The non-transitory storage medium of claim 13, wherein determining a set of file properties of the file includes binary data, metadata, sections, file hashes, and unique strings.

15. The non-transitory storage medium of claim 13, further comprising removing, after determining web traffic of the virtual machine to external sources, the baseline reading of web traffic of the virtual machine to filter the determined web traffic of noise.

16. The non-transitory storage medium of claim 13, wherein the virtual machine further comprises an operating system based on a file type of the file.

17. The non-transitory storage medium of claim 13, further comprising comparing the repository against one or more databases of known indicators of malware.

* * * * *

UNITED STATES PATENT AND TRADEMARK OFFICE
CERTIFICATE OF CORRECTION

| | | |
|---|---|---|
| PATENT NO. | : 11,930,019 B2 | Page 1 of 1 |
| APPLICATION NO. | : 17/236056 | |
| DATED | : March 12, 2024 | |
| INVENTOR(S) | : Reem Abdullah Algarawi et al. | |

It is certified that error appears in the above-identified patent and that said Letters Patent is hereby corrected as shown below:

In the Claims

Column 16, Claim 13, Line 25, delete "virtual machine,;" and replace with "virtual machine;".

Signed and Sealed this
Second Day of July, 2024

*Katherine Kelly Vidal*

Katherine Kelly Vidal
*Director of the United States Patent and Trademark Office*